United States Patent [19]

McFarlin et al.

[11] Patent Number: 4,726,694
[45] Date of Patent: Feb. 23, 1988

[54] BEARING ARRANGEMENT

[75] Inventors: David J. McFarlin, Ellington; Arthur E. Mensing, Bolton, both of Conn.

[73] Assignee: United Technologies Corporation, Hartford, Conn.

[21] Appl. No.: 54,333

[22] Filed: May 26, 1987

[51] Int. Cl.⁴ .............................. F16C 32/06
[52] U.S. Cl. .................... 384/119; 384/114; 384/624
[58] Field of Search .............. 384/119, 114, 624, 102, 384/272, 279, 107, 118, 297

[56] References Cited

U.S. PATENT DOCUMENTS

| | | | |
|---|---|---|---|
| 3,009,747 | 11/1961 | Pitzer | 384/272 |
| 3,360,309 | 12/1967 | Voorhies | 384/119 |
| 3,603,654 | 9/1971 | Bird | 384/102 |
| 4,394,091 | 7/1983 | Klomp | 384/102 |

*Primary Examiner*—Lenard A. Footland
*Attorney, Agent, or Firm*—Peter R. Ruzek

[57] ABSTRACT

A bearing arrangement which is to be used for supporting a rotatable shaft used in a system employing a pressurized medium at a pressure which is partially dependent on the speed of rotation of the shaft includes a main bearing sleeve mounted on a support and surrounding the shaft. The working medium is supplied between the shaft and the bearing sleeve to fully support the shaft in the bearing sleeve when the pressure of the working medium exceeds a predetermined value. The bearing arrangement further includes at least one, but possibly more than one, auxiliary bearing including a split bearing ring which has a conical outer circumferential surface and a stationary outer bearing ring surrounding the split bearing ring and having a conical inner ramp surface. A resilient spring acts on the split bearing ring in one axial direction of the shaft against pressure forces of working medium to cause the contact surface to slide on the ramp surface with an attendent reduction in the transverse dimensions of the split bearing ring to bring the inner surface of the split bearing ring into supporting contact with the shaft for the auxiliary bearing to furnish at least a portion of the required supporting effect when the pressure of the working medium is below the predetermined value.

19 Claims, 2 Drawing Figures

BEARING ARRANGEMENT

TECHNICAL FIELD

The present invention relates generally to bearings, and more particularly to a bearing for use in a system employing a pressurized working medium at a pressure which is related to the speed of rotation of the shaft that is supported by the bearing.

BACKGROUND ART

There are already known various constructions of bearings, among them such in which a pressurized fluid is being supplied into the bearing to form a thin supporting film which supports the shaft which is received in the bearing for rotation. Such bearings perform to satisfaction so long as the supply of the pressurized fluid is assured regardless of the rotation of the shaft, that is, so long as the thin supporting film is in existence at any time at which the shaft rotates, including the start-up and wind-down phases of the rotation of the shaft. On the other hand, the operation of such bearings leaves much to be desired when they are being used in applications in which the pressure of the pressurized fluid supplied to the bearing is dependent on the speed of rotation of the shaft that is rotatably supported in the bearing, since then the shaft may run "dry" during certain time periods, such as during the start-up and winddown phases of rotation of the shaft when the pressure of the pressurized fluid is directly proportional to the speed of rotation of the shaft. This, of course, is very disadvantageous, since such "dry" operation results in an excessive wear of the bearing. Moreover, the bearing offers an excessive frictional resistance to the rotation of the shaft during such "dry" operation, which is especially disadvantageous during the start-up phase, since either the period of time needed to reach the required shaft speed is undesirably long, or the motor driving the shaft will have to be overdimensioned.

Accordingly, it is a general object of the present invention to avoid the disadvantages of the prior art.

More particularly, it is an object of the present invention to provide a bearing arrangement of the type here under consideration, in which the wear of the bearing material is reduced to a minimum.

Yet another object of the present invention is to design the bearing arrangement of the above type in such a manner as to keep the frisupporting a rotatable shaft used in a system employing a pressurized medium at a pressure which is dependent on the speed of rotation of the shaft, this bearing arrangement including main bearing means that includes a bearing sleeve mounted on a support and surrounding a first portion of the shaft, and means for supplying the pressurized working medium between the first portion of the shaft and the bearing sleeve to fully support the shaft in the bearing sleeve when the pressure of the pressurized working medium exceeds a predetermined value. The bearing arrangement further includes auxiliary bearing means including at least one bearing member which is mounted on the support for displacement into and out of contact with a second portion of the shaft, and means for urging the bearing member into contact with the second portion of the shaft to furnish at least a portion of the required supporting effect when the pressure of the pressurized working medium is below the predetermined value.

It is particularly advantageous when the bearing member is constituted by a split bearing ring which has a conical outer circumferential surface and when there is further provided an outer bearing ring which is stationary and surrounds the split bearing ring, this outer bearing ring having a conical inner ramp surface which is adapted to contact the conical outer circumferential surface of the split ring to act as a guide therefor. Then, the urging means advantageously includes resilient spring means which acts on the split bearing ring in one axial direction of the shaft to cause the outer circumferential surface of the split bearing ring to slide on the inner ramp surface of the outer bearing ring in the sense of reducing the transverse dimensions of the split bearing ring and bringing the inner surface of the split bearing ring into supporting contact with the second portion of the shaft. The pressure of the pressurized working medium may then advantageously be used to counteract the influence of the resilient spring means on the split bearing sleeve and to displace the split bearing ring in the opposite axial direction and out of contact with the second portion of the shaft when the pressure of the pressurized working medium exceeds the predetermined value.

A particular advantage of the bearing arrangement according to the present invention is that the auxiliary bearing means acts as the exclusive bearing means at the commencement of the rotation of the shaft when the pressure of the pressurized working medium is at zero gauge, while the main bearing means and particularly the pressurized working medium supplied thereto acts as the sole bearing means during operation within the normal range of speeds of rotation of the shaft. This advantage is achieved because the auxiliary bearing means, which is advantageously made of a low-friction material, such as polyimide, filled polyimide or filled polytetrafluoroethylene, offers very low frictional resistance to the rotation of the shaft when active, while its supporting action protects the main bearing means which at that time is not protected by the film of the working medium since the latter is at an insufficient or non-existent superatmospheric pressure. On the other hand, only the still lower frictional resistance of the film of the pressurized working medium present in the main bearing means to the rotation of the shaft is effective during the normal operation of the equipment including the shaft when the pressure of the working medium as determined by the speed of rotation of the shaft exceeds the predetermined value, since then the auxiliary bearing means is out of contact with the second portion of the shaft. Thus, the bearing arrangement of the present invention takes advantage of the benefits of both self-lubricating bearings and working fluid lubricated bearings, without incurring the disadvantages of either one of them.

BRIEF DESCRIPTION OF THE DRAWING

The present invention will be described in detail below with reference to the accompanying drawing in which.

BEST MODE FOR CARRYING OUT THE INVENTION

Figure 1:
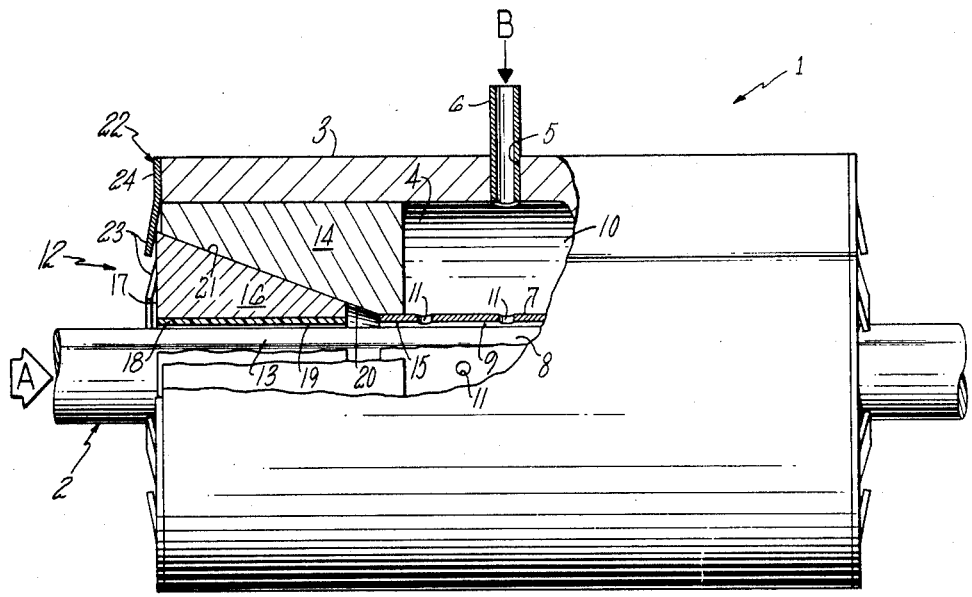
FIG. 1 is a partially sectioned side elevational view of a bearing constructed in accordance with the present invention.

Referring now to the drawing in detail, and first to FIG. 1 thereof, it may be seen that the reference numeral 1 has been used therein to identify the bearing arrangement of the present invention in its entirety. The bearing arrangement 1 is being used for supporting a shaft 2 for rotation about its longitudinal axis. The illustrated bearing arrangement 1 includes as one of its main components a housing 3 which acts as a main support of the bearing. The housing 3 is, in turn, supported, in any manner which is conventional and hence has not been illustrated, on another support of the equipment in which the bearing arrangement 1 is being used, be it a machine frame, a mounting element or portion, or an adjacent component of the equipment. To give an example, if the bearing arrangement 1 is to be used in an air conditioning or refrigerating system including a compressor or a pump for a refrigerant, the housing 3 may be secured to the compressor or pump housing or may be constituted by a portion of such compressor or pump housing.

In any event, the system employing the bearing arrangement 1 utilizes a pressurized working medium, such as the aforementioned refrigerant or another fluid which is capable of being used as a lubricant in the bearing arrangement 1 as well and the pressure of which is dependent on the speed of rotation of the shaft 2. Thus, in the above example, the pressure of the refrigerant may be directly proportional to the speed of rotation of the shaft 2, even though not necessarily linearly and over the entire speed range of the shaft 2, for instance because the shaft 2 is being used to drive the compressor or pump. The bearing arrangement 1 is particularly well suited for use in situations where the working medium is a gas or vapor that possibly, but not necessarily, contains some entrained atomized oil.

The housing 3 bounds an internal passage 4 in which a longitudinal section of the shaft is accommodated with a radial spacing from the inner circumferential surface of the housing 3. The above-mentioned working medium is supplied into the passage 4 through an opening 5 provided in the housing 3 and, as shown, through a supply pipe 6 which is partially received in the opening 5 and is sealingly secured to the housing 3. In operation, only such amounts of the working medium as are needed to replenish the working medium leaving the passage 4 due to leakage will actually be supplied into the passage 4; yet, the pressure of the working medium present in the passage 4 will be dependent on the pressure of the working medium in the system, for instance at the output of the pump or compressor.

A bearing sleeve 7 constituting main bearing means is received in the passage 4 at a radial spacing from the internal surface of the housing 3 and around a first portion 8 of the shaft 2, forming a gap 9 with the external surface of the first portion 8 of the shaft 2. The size of the gap 9 is in reality very small, substantially corresponding to the thickness of a supporting layer or film of the working medium which is formed at normal operating speeds between the inner surface of the bearing sleeve 7 and the external surface of the first shaft portion 8 during the rotation of the shaft 2. The size of this gap 9 has been greatly exaggerated in the drawing for the sake of clarity. The bearing sleeve 7 separates the gap 9 from a distribution chamber 10 which is radially delimited by the external surface of the bearing sleeve 7 and by the internal surface of the housing 3. The bearing sleeve 8 is provided with a plurality of perforations or holes 11 through which the working medium can flow from the distribution chamber 10 into the gap 9 to form the aforementioned supporting film in the gap 9 when the shaft 2 rotates at a speed in the normal operating range. On the other hand, when the pressure of the working medium is below a predetermined value, which implies rotation of the shaft at a speed below the normal operating range, the external surface of the shaft 2 would contact the inner surface of the bearing sleeve 7 if the latter were the only bearing means for the shaft 2.

To avoid this possibility and the attendant excessive wear of the bearing sleeve 9 and/or of the first shaft portion 8 and the attendant undesired excessive frictional resistance to the rotation of the shaft 2, there is further provided an auxiliary bearing means 12 which is also received in the passage 4 and surrounds a second portion 13 of the shaft 2. The auxiliary bearing means 12 axially delimits the distribution chamber 10 and supports the bearing sleeve 7. It is currently preferred to provide one such auxiliary bearing means 12 at each axial side of the main bearing means constituted by the bearing sleeve 7, but it will be appreciated that, under certain circumstances, one such auxiliary bearing means would be sufficient.

The illustrated auxiliary bearing means 12 includes an annular outer bearing member 14 which is stationary relative to the housing 3 at least in the axial direction, be it because it is connected to the housing 3 in any known manner, because it is constituted by an integral portion of the housing 3, because it is confined, because the pressure of the working medium in the distribution chamber 10 prevents it from axial displacement, or because it is connected to the bearing sleeve 7. It is currently preferred to connect the outer bearing member 14 to the bearing sleeve 7 by outwardly swaging an end portion 15 of the bearing sleeve 7 to form an interference fit with the outer bearing member 14. The auxiliary bearing means 12 further includes an annular inner bearing member 16 which is situated inwardly of the outer bearing member 14. As shown, the inner bearing member 16 includes a body 17 which may be of a metallic material, and a layer 18 of a low-friction or self-lubricating synthetic plastic material which lines the inner bore of the body 17. Suitable materials for the layer 18 include polyimide, a mixture including a polymer resin and polytetrafluoroethylene and other known self-lubricating materials to the extent that they are compatible with the working medium. When using the above mixture, the polytetrafluoroethylene may be present in the mixture in the form of particles which are uniformly distributed in a matrix of the polymer resin and/or ceramic particles may be interspersed in the mixture. While it is sufficient to provide only the layer 18 of the self-lubricating material on the interior of the core 17, the inner bearing member 16 could also be made of the synthetic plastic material in its entirety, and the outer bearing member 14 could be made of the same or of a different synthetic plastic material as well. The inner surface of the inner bearing member 16 is shown to surround the external surface of the second shaft portion 13 with a spacing 19.

The outer bearing member 14 has an inner surface 20 which converges in the direction indicated by the arrow A to constitute a ramp surface. The inner bearing member 16 has an outer surface 21 which also tapers in the direction of the arrow A to constitute a contact surface. It is currently contemplated to make the surfaces 20 and 21 frusto-conical, but they could also have other configurations, for instance frusto-pyramidal, if so desired. The angles of convergence of the surfaces 20 and 21 are the same, so that the surfaces 20 and 21 are in area contact with one another when pressed against one another, and the contact surface 21 of the inner bearing member 16 is capable of sliding along the ramp surface 20 of the outer bearing member 14 with attendant reduction in the transverse dimensions of the inner bearing member 16, as will be discussed below.

Figure 2:
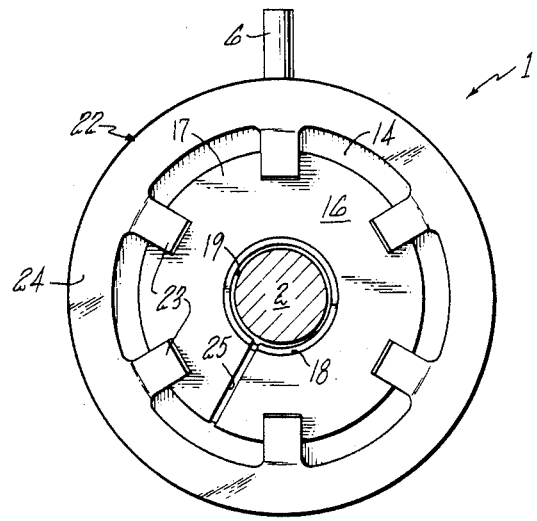
FIG. 2 is an end view of the bearing arrangement taken in the direction of the arrow A of FIG. 1.

The bearing arrangement 1 further includes a resilient spring element 22 which is shown to be juxtaposed with the respective end face of the housing 3. This spring element 22 stationary relative to the housing 3 at least in the axial direction, either by being physically connected thereto by screws or other fastening elements, or by being confined between the aforementioned end face of the housing and a flange or a similar confining element, for instance, a pump or compressor housing. As shown particularly in FIG. 2 of the drawing, the spring element 22 of the illustrated bearing arrangement 1 includes a plurality of radially inwardly extending resilient fingers 23 and an annular interconnecting portion 24 which connects the resilient fingers 23 with one another to give the spring element 22 a unitary construction. FIG. 2 also shows that the inner bearing member 16 is provided with a split 25 which is shown to extend radially through the entire inner bearing member 16 and which also extends over the entire axial length of the inner bearing member 16 to enable the same to radially expand and to be radially contracted by application of radially inwardly acting forces thereon. In its relaxed condition, the inner bearing member 16 is expanded, so that the spacing 19 is considerable.

Turning now back to FIG. 1 of the drawing, it may be seen that the interconnecting portion 24 of the spring element 22 may serve as an abutment for the outer bearing member 14 if the axial position of the latter is not assured in any other way. On the other hand, the resilient fingers 23 of the spring element 22 are in contact with the outer end face of the inner bearing member 16 and urge the same in the direction of the arrow A.

Having so described the construction of the bearing arrangement 1 of the present invention, its operation will now be explained, still with reference to the drawing. First, it is to be mentioned that the various components of the bearing arrangement are shown therein in the positions which they assume during the normal operation of the system in which the bearing arrangement 1 is used, that is, when the shaft 2 rotates at a speed above a predetermined threshold value and the pressure of the working medium is above a predetermined value.

Under these circumstances, the pressure of the working medium in the distribution chamber 10 and in the gap 9 is sufficient to form the aforementioned shaft-supporting film in the gap 9. At the same time, the working medium leaves the gap 9 through the respective end of the bearing sleeve 7 and its pressure acts on that axial end face of the inner bearing member 16 which is closer to the bearing sleeve 7, causing displacement of the inner bearing member 16 opposite to the direction of the arrow A. Now, since the natural or relaxed state of the inner bearing member 16 is its expanded state, and since the confining or inwardly pressing action of the outer bearing member 14 on the inner bearing member 16 is reduced or eliminated altogether during this axial displacement of the inner bearing member 16, the latter expands substantially uniformly in all radial directions, thus creating the spacing 19. Thus, it may be seen that the bearing sleeve 7 and the working medium film formed between the same and the external surface of the first shaft portion 8 is the sole bearing means for the shaft 2 under these normal operating conditions.

During the displacement of the inner bearing member 16 opposite to the direction of the arrow A, the resilient fingers 23 of the spring element 22 are resiliently deflected by the action of the inner bearing member 16 thereon, until an equilibrium is achieved between the spring forces exerted thereby and the pressure forces applied by the pressurized working medium on the inner bearing sleeve 16. Now, if the pressure of the working medium is reduced, the forces exerted by the resilient fingers 23 on the inner bearing sleeve 16 will outweigh the working medium pressure forces and displace the inner bearing sleeve 16 in the direction of the arrow A, so that the contact surface 21 of the inner bearing member 16 rides on the ramp surface 20 of the outer bearing member 14, resulting in radially inward deformation or contraction of the inner bearing member 16 and attendant reduction in the magnitude of the spacing 19, until the latter is eliminated altogether once the pressure of the working medium is reduced to the predetermined value. From then on, further reduction in the pressure of the working medium will result in further displacement of the inner bearing member 16 in the direction of the arrow A, causing the inner bearing member 16 to contribute more and more to the total supporting effort needed to support the shaft 2 by pressing more and more against the external surface of the second shaft portion 13, until finally the auxiliary bearing means 12 becomes the sole bearing means for the shaft 2 when the gauge pressure of the working medium drops to zero. Of course, when the pressure of the working medium starts to rise again, as it does during a start-up operation of the equipment using the bearing arrangement 1, the above process is reversed, so that the auxiliary bearing means 12 is the sole bearing means for the shaft 2 initially and its function is gradually taken over by the bearing sleeve 7 and the working medium film building up in the gap 9 as the pressure of the working medium increases. Thus, it may be seen that the main bearing means is in effect only when it works most efficiently, while the auxiliary bearing means 12 takes over the shaft-supporting function only during such operating conditions where the main bearing means would be subject to excessive wear and would exert excessive frictional forces on the shaft 2. It will be appreciated that the above-discussed cooperation of the main and auxiliary bearing means brings about results which are vastly superior to those achieved by either one of these bearing means alone.

It should be understood that the invention is not limited to the particular embodiment shown and described herein, but that various changes and modifications may be made without departing from the spirit or scope of the concept as defined by the following claims.

We claim:
1. A bearing arrangement for supporting a rotatable shaft used in a system employing a pressurized working medium at a pressure which is dependent on the speed of rotation of the shaft, comprising:
   a support;
   main bearing means including a bearing sleeve mounted on said support and surrounding a first portion of the shaft, and means for supplying the pressurized working medium between the first portion of the shaft and said bearing sleeve to fully support the shaft in said bearing sleeve when the pressure of the working medium exceeds a predetermined value;

auxiliary bearing means including at least one bearing member mounted on said support for displacement into and out of contact with a second portion of the shaft; and means for urging said bearing member into contact with said second portion of the shaft to furnish at least a portion of the required shaft supporting effect when the pressure of the working medium is below said predetermined value.

2. The bearing arrangement according to claim 1, and further comprising means for moving said bearing member against the action of said spring means when the pressure of the working medium exceeds said predetermined value.

3. The bearing arrangement according to claim 1, wherein said auxiliary bearing means further includes an outer bearing member situated radially outwardly of said bearing member, said bearing members being movable relative to one another axially of the shaft and a first of said bearing members having a ramp surface which diverges in a predetermined axial direction of the shaft; and wherein said urging means is operative for causing a second of said bearing members to contact and slide axially along said ramp surface with attendant radially inward displacement of the inner of said bearing members into said contact with said second portion of said shaft.

4. The bearing arrangement according to claim 3, wherein said urging means includes resilient spring means.

5. The bearing arrangement according to claim 4, wherein said outer bearing member is stationary relative to said support; and wherein said resilient spring means acts on said inner bearing member to urge the same opposite to said predetermined axial direction.

6. The bearing arrangement according to claim 5, wherein said resilient spring means includes a plurality of substantially radially extending resilient fingers having outer portions that are stationary relative to said support and inner portions which engage said inner bearing member.

7. The bearing arrangement according to claim 6, wherein said resilient spring means further includes an annular mounting portion interconnecting said outer portions of said resilient fingers.

8. The bearing arrangement according to claim 7, wherein said support includes a housing bounding an internal passage for accommodating the shaft, said bearing sleeve and said inner and outer bearing members and having two axial end faces; and wherein at least a part of said annular mounting portion of said resilient spring means is juxtaposed with one of said axial end faces of said housing.

9. The bearing arrangement according to claim 8, wherein said inner bearing member has an axial end surface which faces in said opposite axial direction and is subjected to the pressure of the working medium for axially moving said inner bearing member against the action of said resilient fingers thereon.

10. The bearing arrangement according to claim 9, wherein said housing externally bounds a distribution space surrounding said bearing sleeve and sealed with respect to the exterior of said housing; and wherein said supplying means includes means for admitting the pressurized working medium into said distribution space, and perforations in said bearing sleeve which open into said distribution space and onto the first portion of the shaft.

11. The bearing arrangement according to claim 1, wherein said auxiliary bearing means is situated at one axial side of said main bearing means; and further comprising additional auxiliary bearing means similar to said auxiliary bearing means and situated at the other axial side of said main bearing means.

12. The bearing arrangement according to claim 1, wherein said bearing member is of self-lubricating synthetic plastic material at least at an inner region thereof which is in contact with the second portion of the shaft.

13. The bearing arrangement according to claim 12, wherein said synthetic plastic material is polyimide.

14. The bearing arrangement according to claim 12, wherein said synthetic plastic material is a mixture including a polymer resin and polytetrafluoroethylene.

15. The bearing arrangement according to claim 14, wherein said polytetrafluoroethylene is present in said mixture in the form of particles homogeneously interspersed in a matrix of said polymer resin.

16. The bearing arrangement according to claim 14, wherein said mixture further includes ceramic particles.

17. The bearing arrangement according to claim 12, wherein said bearing member includes a main body and a layer of said synthetic plastic material at said inner region thereof.

18. The bearing arrangement according to claim 17, wherein said main body is of a metallic material.

19. The bearing arrangement according to claim 1, wherein said bearing member is annular to circumferentially surround the second portion of the shaft and is split at least axially for enhancing radial yieldability of said bearing member.

* * * * *